Figure 1:
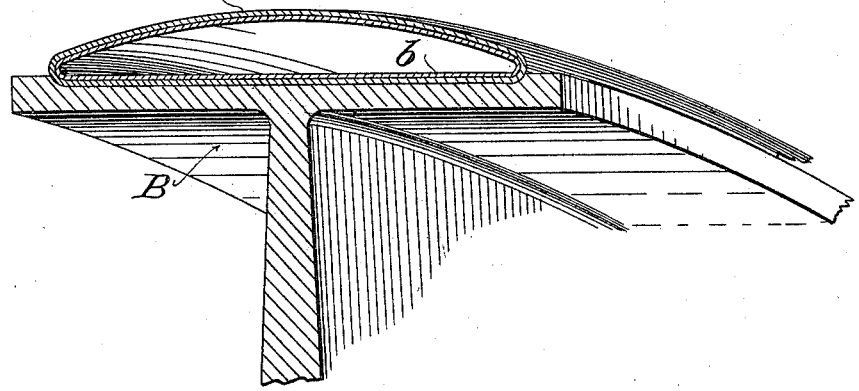

(No Model.) 2 Sheets—Sheet 1.

J. RICHARDSON.
METHOD OF MANUFACTURING PNEUMATIC TIRES.

No. 537,361. Patented Apr. 9, 1895.

Witnesses

Inventor,
John Richardson
by Pollok & Mauro
his Attorneys (No Model.) 2 Sheets—Sheet 2.
J. RICHARDSON.
METHOD OF MANUFACTURING PNEUMATIC TIRES.
No. 537,361. Patented Apr. 9, 1895.
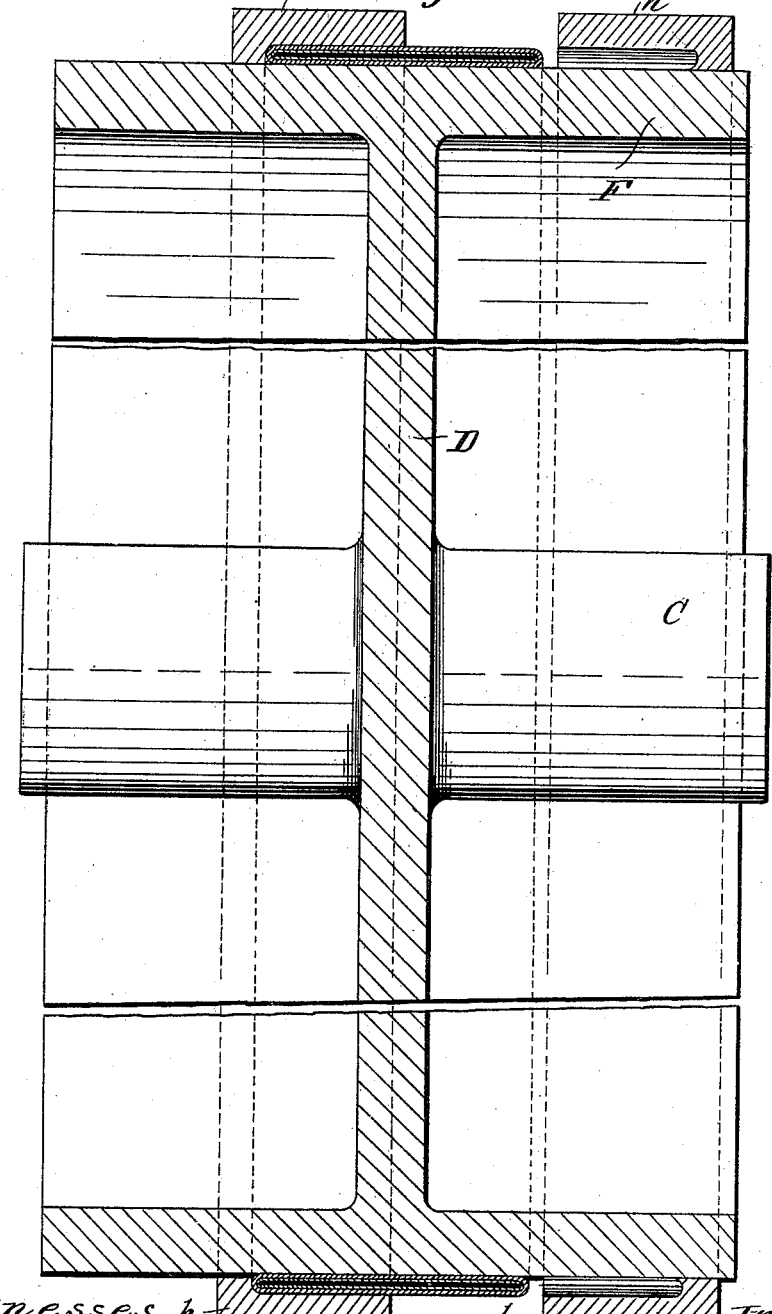
Witnesses
W. R. Edelen.
[signature]
Inventor
John Richardson
by Pollok & Mauro,
his Attorneys

UNITED STATES PATENT OFFICE.

JOHN RICHARDSON, OF PASSAIC, NEW JERSEY, ASSIGNOR TO THE NEW YORK BELTING AND PACKING COMPANY, LIMITED, OF NEW YORK, N. Y.

METHOD OF MANUFACTURING PNEUMATIC TIRES.

SPECIFICATION forming part of Letters Patent No. 537,361, dated April 9, 1895.

Application filed August 6, 1894. Serial No. 519,540. (No model.)

*To all whom it may concern:*

Be it known that I, JOHN RICHARDSON, of Passaic, New Jersey, have invented a new and useful Improvement in the Method of Manufacturing Pneumatic Tires, which is fully set forth in the following specification.

This invention has reference more particularly to the manufacture of hollow or tubular tires intended to be inflated by air or other fluid under pressure.

Tires of the kind to which this invention especially relates are generally known to the trade as "laced tires," "laced inner tube tires," and "single tube hose pipe tires."

In the manufacture of laced tires the procedure heretofore has been usually as follows: The several layers of rubber, duck, canvas, or other material, of which the tube is composed, are applied in proper order upon an annular core of circular cross-section. This core is not endless, but its ends are abutted and fastened together during the process of manufacture. When the layers of rubber and fabric are formed or built up on the annular core to the proper thickness, the whole is placed in an annular mold, whose cavity is of circular cross-section and of the exact size of tire required. This mold is necessarily in two parts, the dividing plane being on a diameter of the circular cross-section of the tire, the mold being split in this way to permit removal of the tire after vulcanization. The mold containing the core and the surrounding layers of rubber and fabric is introduced between the plates of a steam-press, or clamped together and placed in a boiler, and subjected to a proper heat for a sufficient length of time to vulcanize the rubber. Such tire when completed will have a fin or rib of rubber around its largest circumference, and the inclosed layer of fabric will have a corresponding crease, these features being caused by the crevice formed by the meeting surfaces of the two parts of the mold. This method of manufacture often results in the rubber and fabric becoming badly pinched and their strength being impaired, in consequence of which there is a large percentage of loss in the manufacture of such tires, and an uncertainty and lack of uniformity as to their strength and durability. Furthermore, the fins and creases thus produced are in the line of the pressure exerted upon the tire when in use, and consequently the tire is stiffer or less resilient in this direction than in a transverse direction.

Tires of the laced inner tube and single tube hose-pipe varieties are sometimes formed by building up the alternate layers of rubber and fabric upon a straight rod or mandrel of circular cross-section until the tube of proper thickness is formed. This tube is then removed from the mandrel, its ends joined and introduced into a mold such as above described. The parts of the mold are clamped together and the tube inflated or distended by steam, air, alcohol, or other medium, resulting in a considerable strain being produced upon the fabric. In this condition the tube is vulcanized in the well known manner. This process is attended with disadvantages and detrimental effects similar to those above referred to, but in a somewhat less degree.

The object of the present invention is to avoid these disadvantages, to prevent loss and uncertainty in the product and to produce a hollow tire having certain valuable features or characteristics, as will be hereinafter fully described.

The invention is further advantageous in that it may be carried out without the use of molds, and without the use of means for distending the tube during vulcanization, whether such means be a solid core, or steam, air or other fluid medium.

The invention has no relation to the construction of the inner air-tube, or inflation tube, and when the construction of the tire is such as requires such a tube separate from the outer tube, sheath, or tire proper, it may be made in the ordinary, or in any suitable way.

The invention consists mainly in first forming or building up a tube of rubber and fabric in any suitable way, and then subjecting said tube to vulcanization while in a flattened condition.

In carrying out this invention the preferred procedure is as follows:—A tube is built up as described above using a straight rod or mandrel. It is then removed from the mandrel and after its ends are joined together is stretched on a drum or pulley, preferably of metal, upon which it assumes the form in cross-section of a very flat ellipse. Or the rubber and fabric may be wound flat upon the drum (with the rubber to form the wearing shoe or tread-portion next to the surface of the drum) and then folded upon itself, thus forming a flat tube. The tube is then covered by suitable means to hold and protect it during vulcanization. The means employed are preferably wrappings of cloth, being economical and readily applied, and for the reason also that the contact of the cloth with the rubber imparts a cloth-finish to that half of the circumference of the tire which is to be cemented to the wheel. The tube may, however, be held on by sheet metal or other material, or by rings, clamps or bands of metal, or in any other way that will accomplish the desired result. The tube is then vulcanized, and completed for use in the ordinary, or in any suitable way—that is to say, if an inner tube laced tire is to be made, a slit is cut in the cover formed by the process described above for the insertion of the tube and valve. If a single tube or hose-pipe tire is to be made, the valve and stem are attached in the well known manner.
Apart from the advantages in manufacture, a tire made by this process is readily distinguished from the product of the processes heretofore employed for the manufacture of tires. It has no fin around its greatest circumference, or on that part which comes into contact with the ground. It has, in its ordinary condition (that is when deflated) the form in cross-section of a very flat ellipse, the major axis being parallel with the axis of the drum or with the axis of rotation of the wheel. The pressure used in vulcanizing produces at the ends of this major axis beads, creases or lines of flexure, which are practically hinges. Consequently the tire possesses the properties of an elliptical spring, or of two semi-elliptical springs hinged together at their ends, and it possesses great resiliency or elasticity in the desired direction, so that the tire adjusts itself readily to the inequalities of roads and pavements. The tire when stretched on the drum is under very little strain, and being vulcanized in this position is much softer and more resilient than when made by other methods.

When a cloth cover or wrapping is used to confine the tube during vulcanization, the half of the tube in contact with the drum has a smooth, glossy or metallic finish, suitable for the exposed portion of the tire; while the other half has a cloth-finish to which the cement used for attaching the tire to the rim will very firmly adhere.

In order that the principle of the invention and the manner in which it is, or may be, practically carried out may be fully understood, a more detailed description will now be given, reference being made to the accompanying drawings which illustrate appliances that may be employed in practicing the invention. It is to be understood, however, that the invention is not dependent upon any special kind of apparatus, but may be carried out in a variety of ways.

Figure 2:
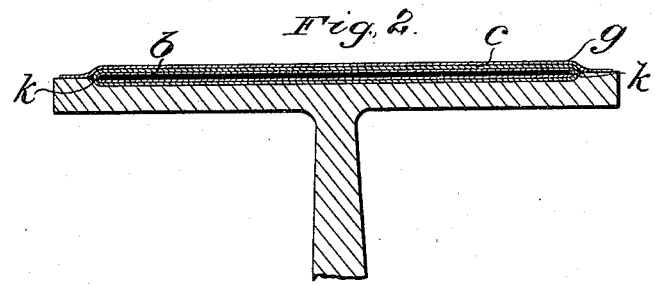
Figure 3:
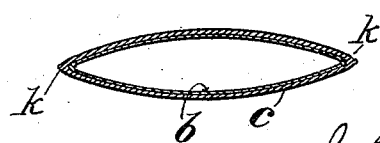

In the drawings—Figure 1 is a sectional perspective showing the tube in place on the drum. Fig. 2 is a similar view showing the tube covered with a wrapping of cloth. Fig. 3 is a transverse section through the completed outer tube in its deflated condition. Fig. 4 is a view in elevation and section of part of a drum suitable for the purposes of the invention.

The tube, as shown in Figs. 1, 2, and 3 is composed of an inner layer or layers $b$ of duck or other fabric, and an outer layer $c$ of rubber, but of course the tube may be built up in any desired way. The drum B around which it is stretched may be provided with a shallow cavity to receive it, as shown in Figs. 1 and 2 but the surface of the drum may be a straight line in cross-section as in Fig. 4. The drum may be made as shown in the latter figure, like a pulley with a hub C, a web D, and a flange F on the periphery of which the tube is stretched.

The tube, when placed on the drum assumes the form of a flattened ellipse, as indicated in Fig. 1 and becoming set in this position by vulcanization retains that form after being removed from the drum. Preferably the tube is covered during vulcanization by a wrapping $g$ of cloth, but in lieu thereof metal rings $h$ may be used as shown in Fig. 4. In the latter case, and whenever a rigid instead of a flexible covering material is used, it is desirable to introduce into the tube sufficient air to keep its surface in contact with all the surfaces of its inclosure. By reason of the position given the tire during vulcanization the edges $k$ $k$ where the tube is bent upon itself form beads, hinges or lines upon which the tire naturally bends or yields when rough surfaces or obstacles are encountered, these lines being, as indicated, at the ends of the major axis of the ellipse.

Other modifications may be made in the mode of procedure adopted, as will be readily understood by persons conversant with the art of manufacturing rubber goods.

Heretofore the inner air-tube or inflation tube, formed of rubber alone, has been vulcanized in a flattened condition for the purpose of more readily introducing it into the outer sheath or covering tube. The present invention, on the other hand, relates to the construction of the outer tube or cover, composed of rubber and fabric, the object being to secure uniformity in the product, avoid injury to the fabric in vulcanization, and produce a tire which as a whole has, when deflated, the form in cross-section of a flattened ellipse, the advantages of which are fully set forth above.

I do not herein claim specifically the method herein before referred to of winding the layers of rubber and fabric flat upon the drum, with the sheet of rubber to form the wearing shoe or tread portion next to the surface of the drum, and then folding the layers upon themselves, making a flat tube, that specific process being reserved to my application, Serial No. 538,256, filed February 13, 1895.

Having now fully explained the principle of my said invention and the best mode known to me of carrying the same into effect, what I claim as new, and desire to secure by Letters Patent, is—

1. In the art of making rubber tires the improvement which consists in forming a tube to constitute the outer portion of the tire, stretching the tube upon the periphery of a drum, so that it assumes in cross-section the form of a flattened ellipse, covering the outer surface of the tube, and then vulcanizing, substantially as described.

2. In the art of making rubber tires the improvement which consists in forming a tube, stretching the same upon a drum, wrapping or covering it with flexible material, and vulcanizing it while in a flattened condition, substantially as described.

3. In the art of making rubber tires, the improvement which consists in forming a tube, placing the same on the periphery of a drum, wrapping it with cloth, and then vulcanizing while in a flattened condition without internal pressure, substantially as described.

4. A pneumatic tire of elliptical shape in cross-section, the major axis of the ellipse being parallel with the axis of rotation of the tire, and having at the ends of the major axis beads or lines of flexure, so that the tire yields readily in the direction of the pressure when in use, substantially as described.

5. A pneumatic tire of elliptical shape in cross-section the major axis of the ellipse being parallel with the axis of rotation of the tire, having at the ends of the major axis beads or lines of flexure, so that the tire yields readily in the direction of the pressure when in use, said tire having a tread portion of smooth metallic finish without fin or mold mark, substantially as described.

6. A pneumatic tire of elliptical shape in cross-section the major axis of the ellipse being parallel with the axis of rotation of the tire, having at the ends of the major axis beads or lines of flexure, so that the tire yields readily in the direction of the pressure when in use, the outer or tread portion of said tire having a smooth metallic finish and the inner portion thereof having a rough or cloth finish, substantially as described.

In testimony whereof I have signed this specification in the presence of two subscribing witnesses.

JOHN RICHARDSON.

Witnesses:
C. H. OAKLEY,
CHAS. T. YOUNG.